(12) United States Patent
Seifien

(10) Patent No.: US 11,642,990 B2
(45) Date of Patent: May 9, 2023

(54) CAR SEAT SWIVEL ASSEMBLY

(71) Applicant: George Seifien, East Rutherford, NJ (US)

(72) Inventor: George Seifien, East Rutherford, NJ (US)

(*) Notice: Subject to any disclaimer, the term of this patent is extended or adjusted under 35 U.S.C. 154(b) by 54 days.

(21) Appl. No.: 17/382,114

(22) Filed: Jul. 21, 2021

(65) Prior Publication Data

US 2023/0022640 A1    Jan. 26, 2023

(51) Int. Cl.
*B60N 2/28*    (2006.01)

(52) U.S. Cl.
CPC ......... *B60N 2/2869* (2013.01); *B60N 2/2821* (2013.01)

(58) Field of Classification Search
CPC .............................. B60N 2/2869; B60N 2/2821
See application file for complete search history.

(56) References Cited

U.S. PATENT DOCUMENTS

| | | | | |
|---|---|---|---|---|
| 4,740,030 A * | 4/1988 | Nordskog | .......... | B64D 11/0691 297/14 |
| 5,857,832 A * | 1/1999 | Al-Temen | ............ | B60N 2/2812 280/727 |
| 6,199,949 B1 * | 3/2001 | DaSilva | ............... | B60N 2/2857 297/256.16 |
| 6,431,647 B2 | 8/2002 | Yamazaki | | |
| 6,572,189 B1 * | 6/2003 | Blaymore | ............ | B60N 2/2869 297/256.16 |
| 7,726,738 B1 | 6/2010 | Rice | | |
| D692,678 S | 11/2013 | Williams | | |
| 9,090,182 B2 | 7/2015 | Rabeony | | |
| 9,587,111 B2 | 3/2017 | Youn et al. | | |
| 10,464,451 B2 | 11/2019 | Stamper | | |
| 10,479,508 B2 * | 11/2019 | Joffre | ................. | B64D 11/0691 |
| 10,829,012 B1 | 11/2020 | Brunick | | |
| 2012/0267927 A1 * | 10/2012 | Rattenbury | .............. | B60N 2/14 297/256.16 |
| 2018/0118058 A1 * | 5/2018 | Anderson | ............ | B60N 2/2821 |
| 2018/0186255 A1 | 7/2018 | Gomez | | |

FOREIGN PATENT DOCUMENTS

| | | | | |
|---|---|---|---|---|
| DE | 10225476 C1 * | 12/2003 | .......... | B60N 2/2821 |
| GB | 2434089 A * | 7/2007 | ............ | B60N 2/286 |
| WO | WO2012146761 | 11/2012 | | |

* cited by examiner

*Primary Examiner* — David R Dunn
*Assistant Examiner* — Tania Abraham

(57) ABSTRACT

A car seat swivel assembly includes a base bracket that can be secured to a vehicle seat and a pivot bracket that is attachable to the base bracket. A chair bracket is provided which is attached to a child car seat. A pair of hinge units is each attached to the chair bracket. Each of the hinge units releasably engages the primary portion of the pivot bracket and the pivot bracket when the chair bracket is in a home position to retain the child car seat in a seated position. The chair bracket is pivotable into a pivoted position on the pivot bracket when a respective one of the hinge units is actuated into an unlocking condition. In this way the hinge units facilitate the child car seat to be directed toward a door of a vehicle thereby facilitating a child to be positioned in the child car seat.

13 Claims, 8 Drawing Sheets

US 11,642,990 B2

CAR SEAT SWIVEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to swivel devices and more particularly pertains to a new swivel device for pivotally mounting a child seat in a vehicle. The device includes a base bracket that can be secured to a vehicle seat in the vehicle and a pivot bracket that is attached to the base bracket. The device includes a chair bracket that is attachable to the child seat and a pair of hinge units that are each attached to the chair bracket. The chair bracket is pivotable on the pivot bracket to facilitate the child car seat to be directed toward a door of the vehicle to facilitate a child to be seated into the child car seat.

(2) Description of Related Art Including Information Disclosed Under 37 CFR 1.97 and 1.98

The prior art relates to swivel devices including a variety of car seat mounts which includes a rotation element that is rotatably recessed into a base for pivoting a child car seat. The prior art discloses a variety of child car seats which include a rotatable base for rotating the child car seat.

BRIEF SUMMARY OF THE INVENTION

An embodiment of the disclosure meets the needs presented above by generally comprising a base bracket that can be secured to a vehicle seat and a pivot bracket that is attachable to the base bracket. A chair bracket is provided which is attached to a child car seat. A pair of hinge units is each attached to the chair bracket. Each of the hinge units releasably engages the primary portion of the pivot bracket and the pivot bracket when the chair bracket is in a home position to retain the child car seat in a seated position. The chair bracket is pivotable into a pivoted position on the pivot bracket when a respective one of the hinge units is actuated into an unlocking condition. In this way the hinge units facilitate the child car seat to be directed toward a door of a vehicle thereby facilitating a child to be positioned in the child car seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
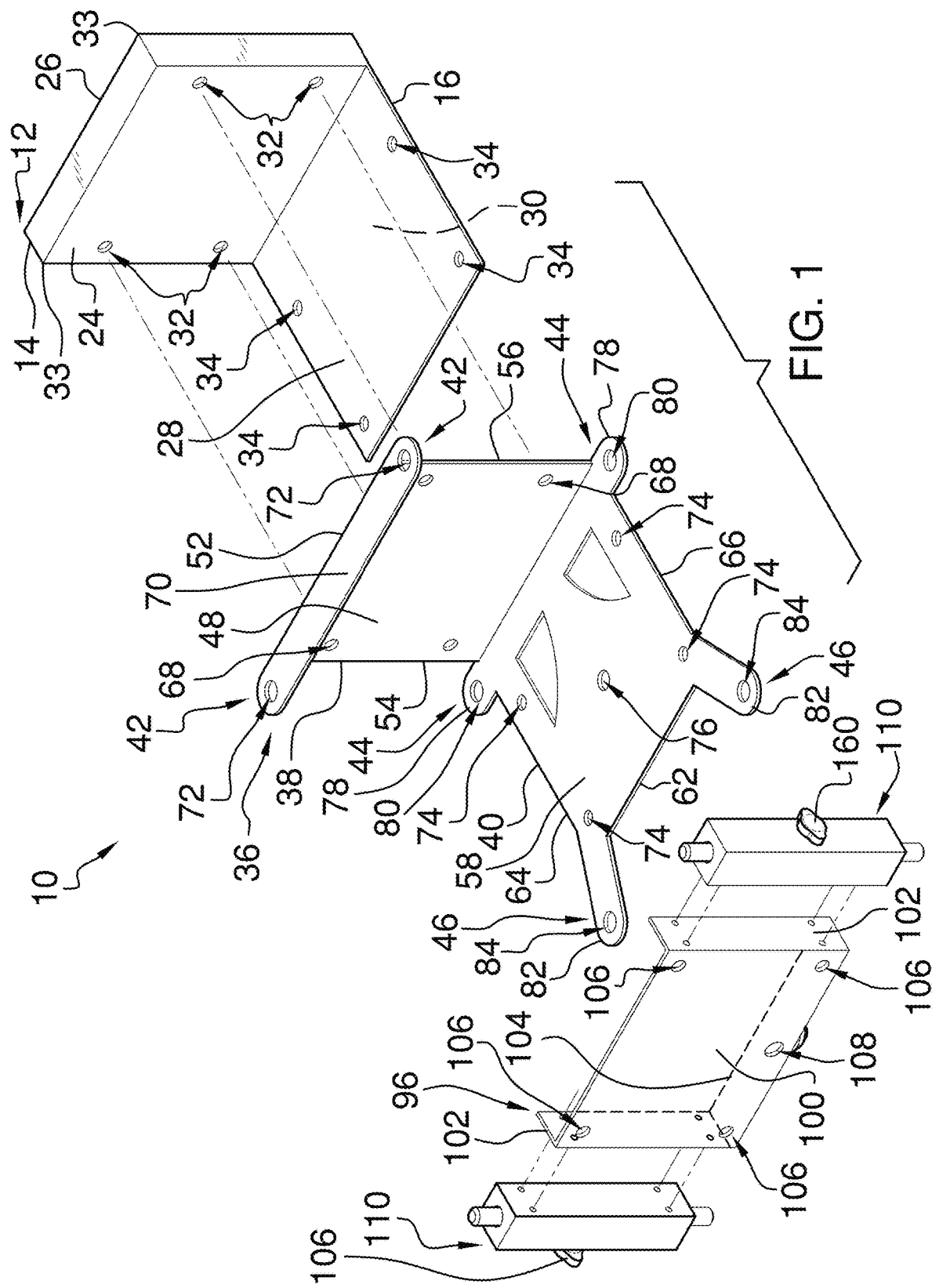
FIG. 1 is an exploded perspective view of a car seat swivel assembly according to an embodiment of the disclosure.
Figure 2:
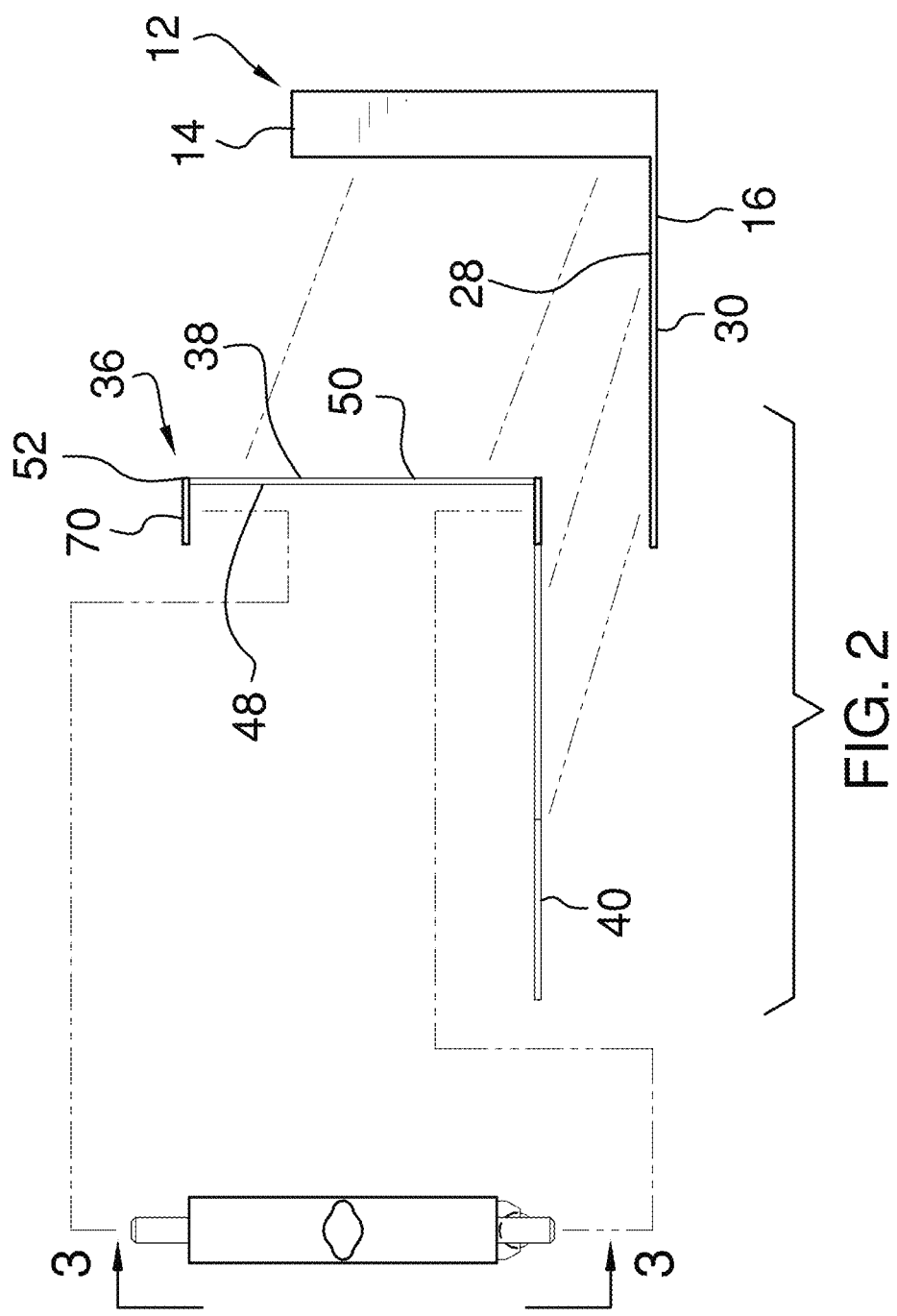
FIG. 2 is a left side exploded view of an embodiment of the disclosure.
Figure 3:
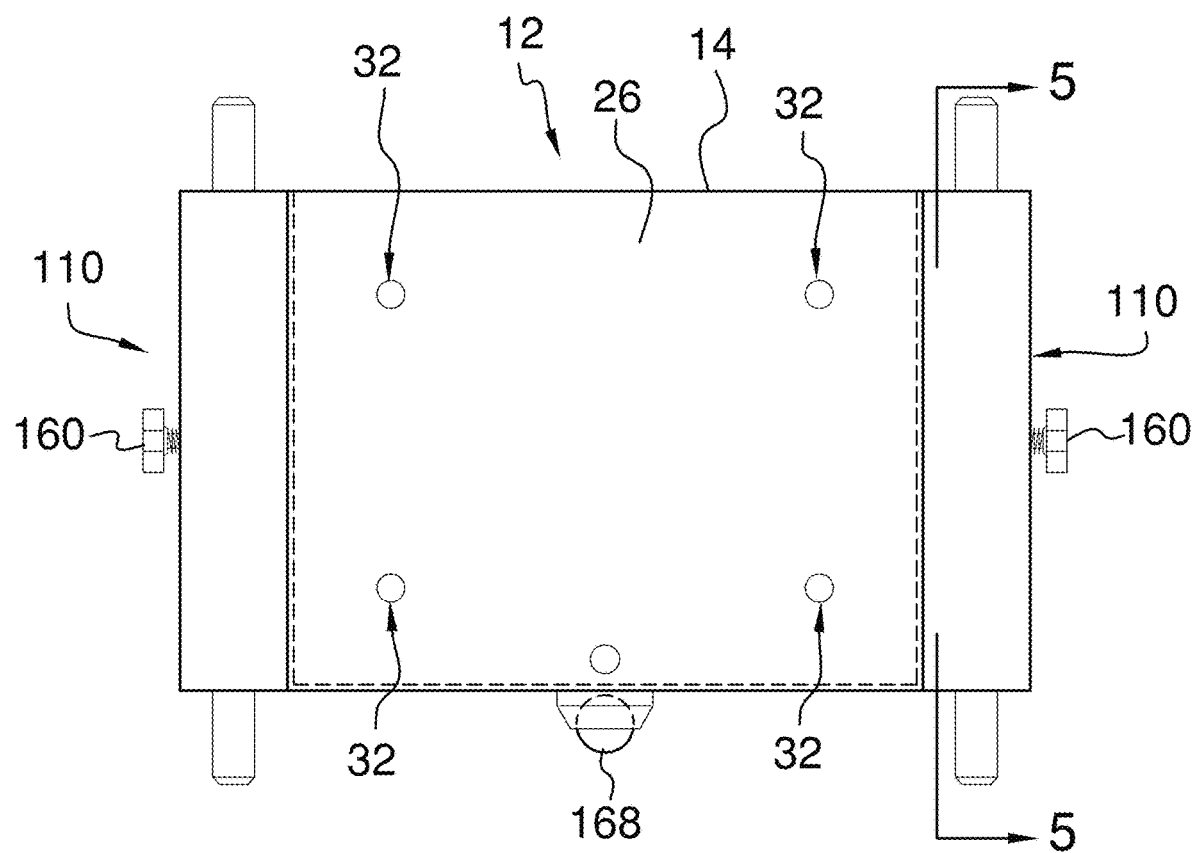
FIG. 3 is a back phantom view of an embodiment of the disclosure.
Figure 4:
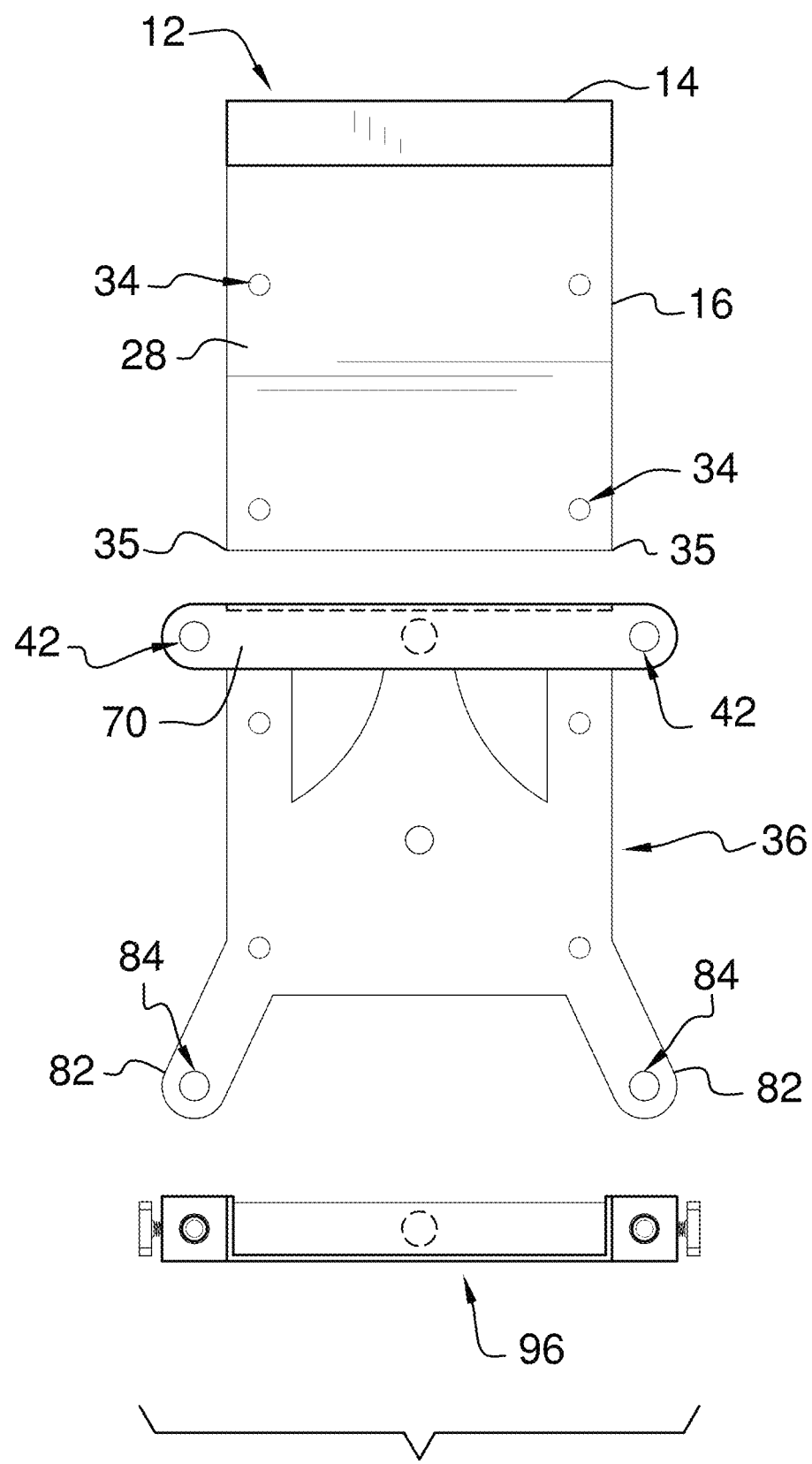
FIG. 4 is an exploded top view of an embodiment of the disclosure.
Figure 5:
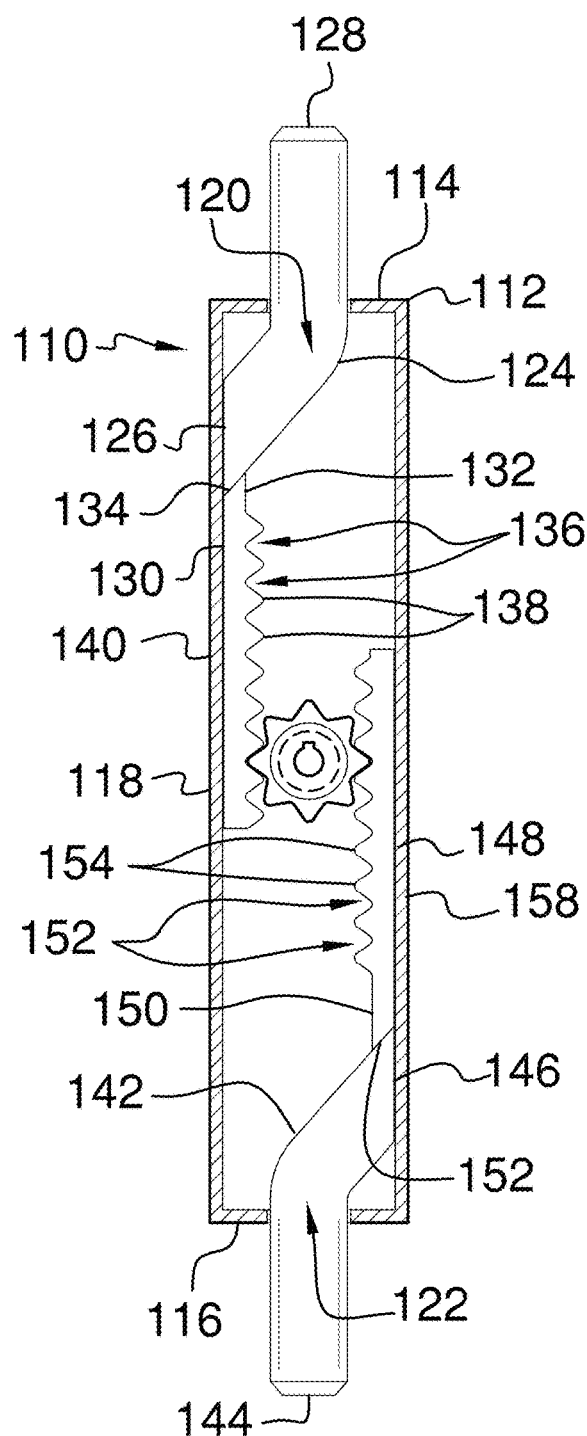
FIG. 5 is a cross sectional view taken along line 5-5 of FIG. 3 of an embodiment of the disclosure showing a hinge unit in a locking condition.
Figure 6:
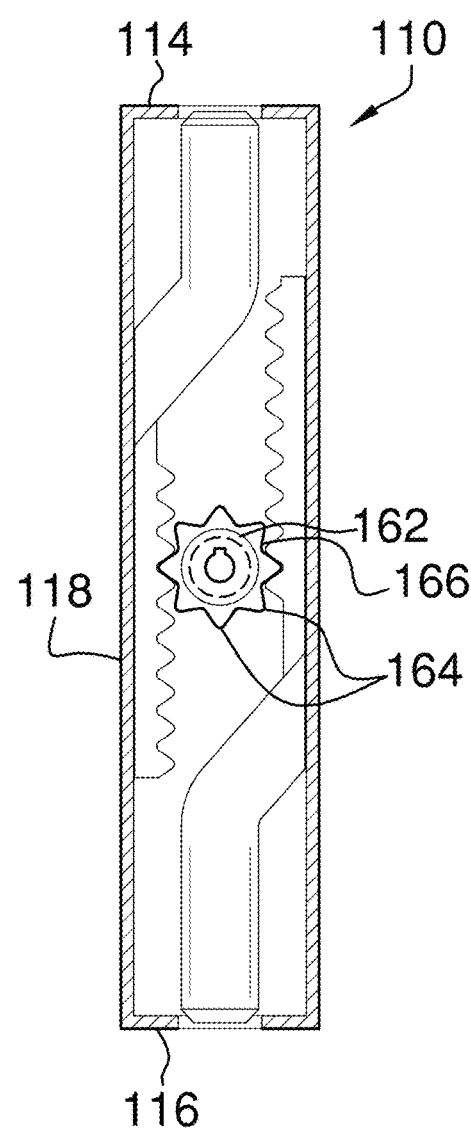
FIG. 6 is a cross sectional view taken along line 5-5 of FIG. 3 of an embodiment of the disclosure showing a hinge unit in an unlocking condition.
Figure 7:
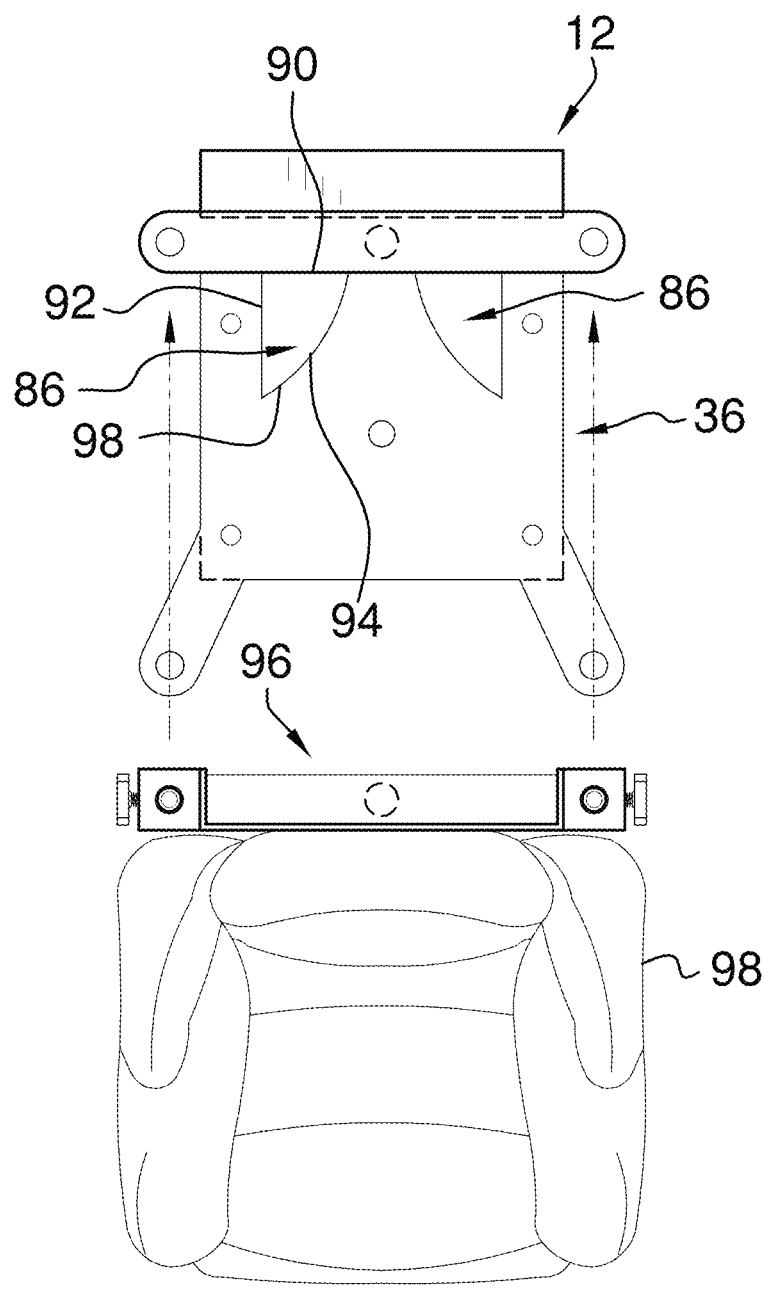
FIG. 7 is an exploded in-use view of an embodiment of the disclosure.
Figure 8:
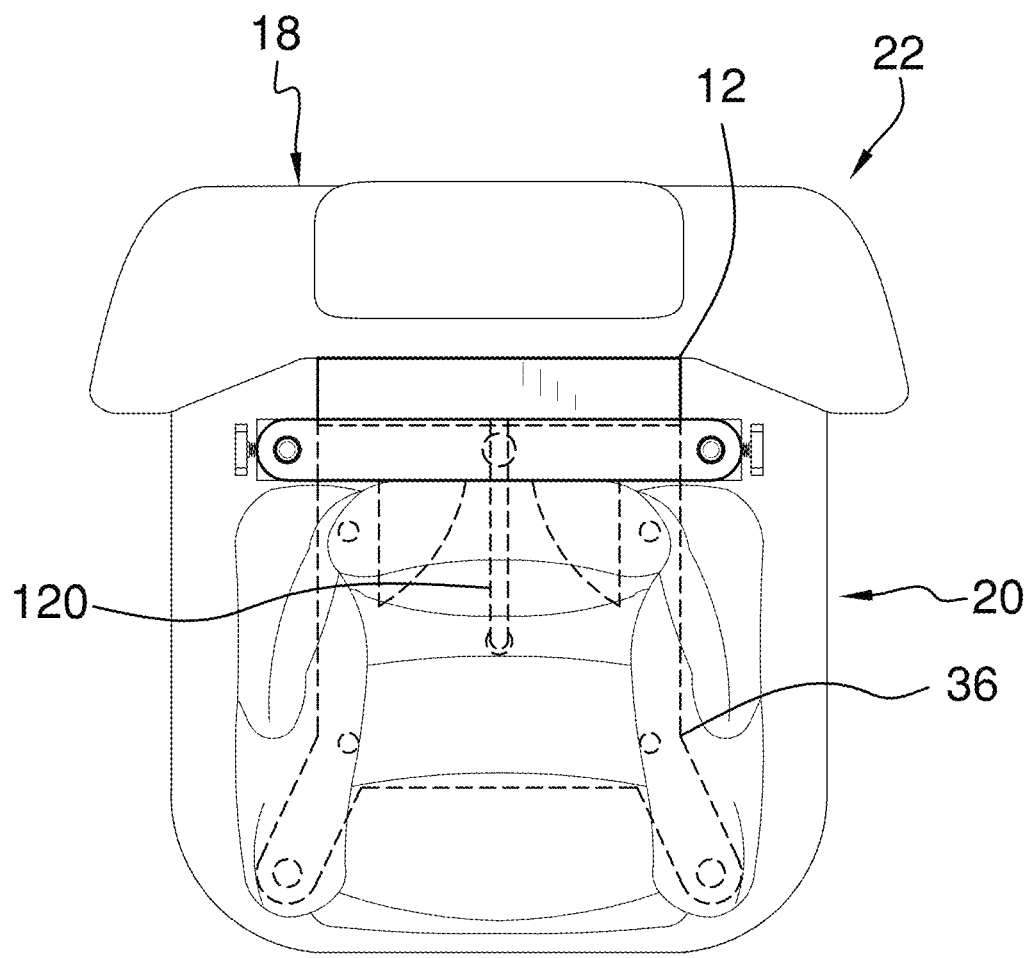
FIG. 8 is a phantom in-use view of an embodiment of the disclosure showing a chair bracket in home position.
Figure 9:
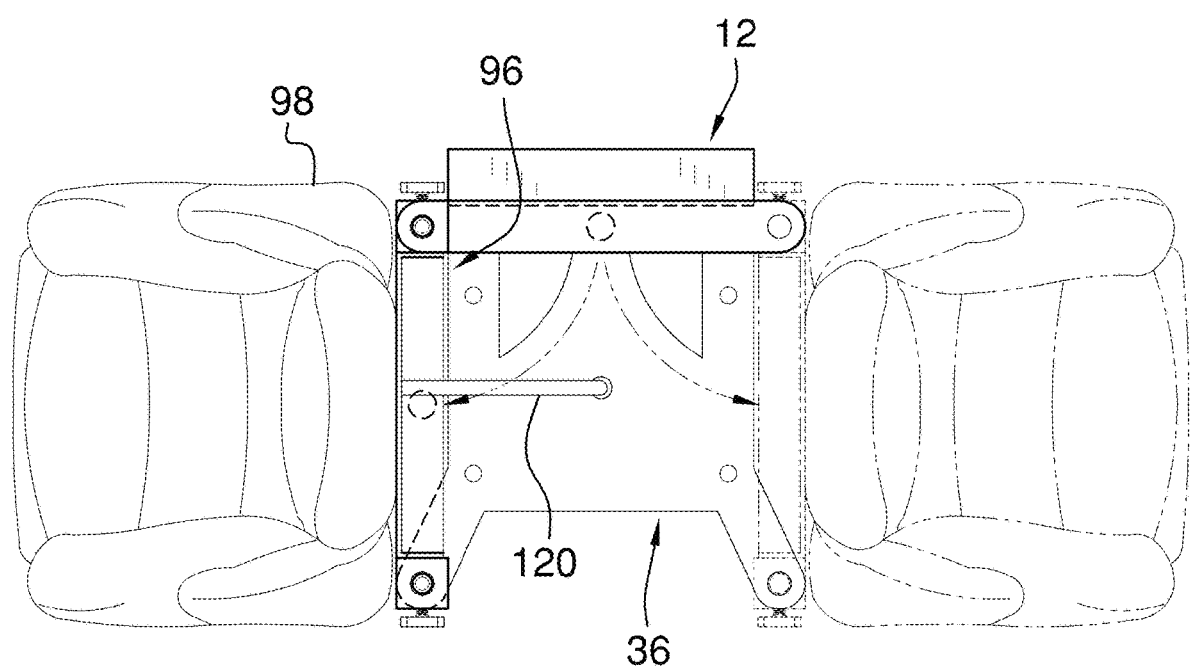
FIG. 9 is a perspective in view of an embodiment of the disclosure showing a chair bracket in a pivoted position.

With reference now to the drawings, and in particular to FIGS. 1 through 9 thereof, a new swivel device embodying the principles and concepts of an embodiment of the disclosure and generally designated by the reference numeral 10 will be described.

As best illustrated in FIGS. 1 through 9, the car seat swivel assembly 10 generally comprises a base bracket 12 that has a first portion 14 that is oriented at an angle with a second portion 16 such that the base bracket 12 has an L-shape. In this way the base bracket 12 can conform to a backrest 18 and a seat 20 of a vehicle seat 22 having the first portion 14 abutting the backrest 18 and having the second portion 16 lying on the seat 20. The vehicle seat 22 may be a back seat in a passenger vehicle, such as an automobile or other type of motorized vehicle that is driven on public roadways. The first portion 14 has a front side 24 and a back side 26, and the second portion 16 has a top side 28 and a bottom side 30. A thickness between the front side 24 and the back side 26 is greater than the thickness between the top side 28 and the bottom side 30. The first portion 14 has a plurality of first holes 32 each extending through the front side 24 and the back side 26 and the first holes 32 is positioned adjacent to a respective one of four corners 33 of the back side 26. The second portion 16 has a plurality of second holes 34 each extending through the top side 28 and the bottom side 30 and each of the second holes 34 is positioned adjacent to a respective one of four corners 35 of the second portion 16.

A pivot bracket 36 is attachable to the base bracket 12 and the pivot bracket 36 has a primary portion 38 which is oriented at an angle with a secondary portion 40 such that the pivot bracket 36 has an L-shape. The primary portion 38 has a pair of engagement points 42 that is integrated into the primary portion 38 and the secondary portion 40 has a pair of first engagement points 44 that is integrated into the secondary portion 40. Each of the first engagement points 44 is aligned with a respective one of the engagement points 42 in the primary portion 38 and the secondary portion 40 has a pair of second engagement points 46 that is integrated into the secondary portion 40. Additionally, each of the second engagement points 46 is spaced from a respective one of the first engagement points 44.

The primary portion 38 has a front face 48, a rear face 50, a top edge 52, a first lateral edge 54 and a second lateral edge 56. The secondary portion 40 has an upper face 58, a lower face 60, a forward edge 62, a first sidelong edge 64 and a second sidelong edge 66. The primary portion 38 has a plurality of primary holes 68 each extending through the front face 48 and the rear face 50. Each of the primary holes 68 is aligned with a respective one of the first holes 32 in the first portion 14 of the base bracket 12.

The primary portion 38 has a member 70 extending forwardly from the front face 48 and the member 70 is aligned with the top edge 52 and the member 70 extends beyond each of the first lateral edge 54 and the second lateral edge 56. The member 70 has a pair of first pin holes 72 each extending through the member 70 such that each of the first pin holes 72 defines a respective one of the engagement points 42 in the primary portion 38. Each of the first pin holes 72 is spaced outwardly beyond a respective one of the first lateral edge 54 and the second lateral edge 56 of the primary portion 38. The secondary portion 40 has a plurality of secondary holes 74 each extending through the upper face 58 and the lower face 60 of the secondary portion 40. Each of the secondary holes 74 is aligned with a respective one of the second holes 34 in the second portion 16 of the base bracket 12.

The secondary portion 40 has a cable hole 76 extending through the upper face 58 and the lower face 60 and the cable hole 76 is centrally positioned on the secondary portion 40. The secondary portion 40 has a pair of first lobes 78 each extending away from a respective one of the first sidelong edge 64 and the second sidelong edge 66. Each of the first lobes 78 is positioned adjacent to the primary portion 38 and each of the first lobes 78 has a second pin hole 80 extending therethrough to define a respective one of the first engagement points 44. The second pin hole 80 in each of the first lobes 78 is aligned with a respective one of the first pin holes 72 in the member 70. The secondary portion 40 has a pair of second lobes 82 each angling away from an intersection between the forward edge 62 and a respective one of the first sidelong edge 64 and the second sidelong edge 66, and the second lobes 82 angle away from each other. Furthermore, each of the second lobes 82 has a third pin hole 84 extending therethrough to define a respective one of the second engagement points 46.

The secondary portion 40 has a pair of openings 86 each extending through the upper face 58 and the lower face 60. Each of the openings 86 has a bounding edge 88 and the bounding edge 88 of each of the openings 86 has a first side 90, a second side 92 and a third side 94. The first side 90 is oriented perpendicular to the second side 92 and the third side 94 curves between the first side 90 and the second side 92 such that each of the openings 86 has a wedge shape. Each of the openings 86 is positioned adjacent to the primary portion 38 having the first side 90 extending along a line that is oriented parallel to the front face 48 of the primary portion 38. Additionally, the third side 94 of each of the openings 86 curves away from each other.

A chair bracket 96 is provided and the chair bracket 96 can be attached to a child car seat 98. The child car seat 98 may be a child car seat of any conventional design that conforms to safety requirements of the National Highway Traffic Safety Administration. The chair bracket 96 has a central portion 100 extending between a pair of outward portions 102 and each of the outward portions 102 is oriented perpendicular to the central portion 100 such that the chair bracket 96 has a U-shape. Additionally, the chair bracket 96 has a lower portion 104 extending between each of the outward portions 102. The central portion 100 has a plurality of mounting holes 106 each extending through the central portion 100 to accommodate fasteners to attach the child car seat 98 to the central portion 100. The central portion 100 has a cable hole 108 extending through the central portion 100. The cable hole 108 in the central portion 100 is centrally positioned between the outward portions 102 and the cable hole 108 in the central portion 100 is positioned adjacent to the lower portion 104.

A pair of hinge units 110 is provided and each of the hinge units 110 is attached to the chair bracket 96. Each of the hinge units 110 is actuatable between a locking condition and an unlocking condition. Each of the hinge units 110 releasably engages a respective one of the engagement points 42 in the primary portion 38 of the pivot bracket 36 and a respective one of the first engagement points 44 in the secondary portion 40 of the pivot bracket 36 when the chair bracket 96 is in a home position. In this way the hinge units 110 retain the child car seat 98 in a seated position. The chair bracket 96 is pivotable into a pivoted position on the pivot bracket 36 when a respective one of the hinge units 110 is actuated into the unlocking condition. In this way the hinge units 110 facilitate the child car seat 98 to be directed toward a door of the vehicle thereby facilitating a child to be positioned in the child car seat 98.

Each of the hinge units 110 comprises a block 112 that has a top end 114, a bottom end 116 and an outer wall 118 extending between the top end 114 and the bottom end 116, and the block 112 is hollow. The top end 114 has a first aperture 120 extending into an interior of the block 112 and the bottom end 116 has a second aperture 122 extending into an interior of the block 112. Each of the hinge units 110 includes a first pin 124 that has a lower end 126 and an upper end 128. The first pin 124 is curved between the lower end 126 and the upper end 128 and the first pin 124 is positioned inside the block 112.

Each of the hinge units 110 includes a first rail gear 130 that is movably disposed within the block 112. The first rail gear 130 has a first surface 132 and a coupled end 134, and the coupled end 134 is coupled to the lower end 126 of the first pin 124 such that the first rail gear 130 extends substantially between the top end 114 and the bottom end 116 of the block 112. The first surface 132 has a plurality of depressions 136 each integrated into the first surface 132 to define a plurality of teeth 138 on the first rail gear 130. Moreover, the first rail gear 130 is positioned against a first side 140 of the outer wall 118 of the block 112 having each of the teeth 138 being directed toward a center of the block 112.

Each of the hinge units 110 includes a second pin 142 which has a lower end 144 and an upper end 146. The second pin 142 is curved between the lower end 144 and the upper end 146 of the second pin 142, and the second pin 142 is positioned inside the block 112. Each of the hinge units 110 includes a second rail gear 148 that is movably disposed in the block 112. The second rail gear 148 has a first surface 150 and a coupled end 152, and the coupled end 152 of the second rail gear 148 is coupled to the lower end 126 of the second pin 142 such that the second rail gear 148 extends substantially between the top end 114 and the bottom end 116 of the block 112. The first surface 150 of the second rail gear 148 has a plurality of depressions 154 each integrated into the first surface 150 of the second rail gear 148 to define a plurality of teeth 156 on the second rail gear 148. The second block 112 is positioned against a second side 158 of the outer wall 118 of the block 112 having each of the teeth 156 on the second rail gear 148 being directed toward a center of the block 112.

Each of the hinge units 110 includes a knob 160 that is rotatably disposed on the outer wall 118 of the block 112 such that the knob 160 can be rotated by a user. Each of the hinge units 110 includes a rotation gear 162 that is disposed within the block 112. The rotation gear 162 is in communication with the knob 160 such that the knob 160 rotates the rotation gear 162 in a first direction when the knob 160 is rotated. The rotation gear 162 has a plurality of teeth 164 on an outer surface 166 of the rotation gear 162 and each of the teeth 164 on the rotation gear 162 engages the teeth 156 on the second rail gear 148 and the teeth 138 on the first rail gear 130. Additionally, the rotation gear 162 is biased to rotate in a second direction.

Each of the first pin 124 and the second pin 142 is urged outwardly through a respective one of the first aperture 120 and the second aperture 122 in the top end 114 and the bottom end 116 of the block 112 when the rotation gear 162 rotates in the second direction. Conversely, each of the first pin 124 and the second pin 142 is retracted into the block 112 when the rotation gear 162 rotates in the first direction. The first pin 124 engages a respective one of the first pin holes 72 in the member 70 associated with the primary portion 38 of the pivot bracket 36 when the chair bracket 96 is in the home position. The second pin 142 engages the second pin hole 80 in a respective one of the first lobes 78 on the secondary portion 40 of the pivot bracket 36 when the chair bracket 96 is in the home position. Conversely, each of the first pin 124 and the second pin 142 disengages the respective first pin hole 72 and the respective second pin hole 80 when the gear rotates in the first direction. The second pin 142 associated with a respective one of the hinge units 110 engages the third pin hole 84 in a respective one of the second lobes 82 on the secondary portion 40 of the pivot bracket 36 when the chair bracket 96 is in the pivoted position. The chair bracket 96 can be pivoted toward either of the second lobes 82 depending on which side of the vehicle seat 22 the child seat is positioned thereby facilitating the child seat to be directed toward either side of the vehicle.

A roller 168 is rotatably disposed on the lower portion 104 of the chair bracket 96. The roller 168 rollably engages the upper face 58 of the secondary portion 40 of the pivot bracket 36 when the chair bracket 96 is moved between the home position and the pivoted position. A cable 170 is attached between the cable hole 76 in the secondary portion 40 of the pivot bracket 36 and the cable hole 76 in the cable hole 76 in the central portion 100 of the chair bracket 96. The cable 170 restricts the travel of the chair bracket 96 on the pivot bracket 36 to no more than 90.0 degrees of rotation in either direction with respect to the home position. Additionally, the cable 170 may be comprised of steel or other similarly resilient material.

In use, the base bracket 12 is strapped to the vehicle seat 22 with a seat belt associated with the vehicle seat 22. In this way the child seat 98 is secured to the vehicle seat 22. Each of the hinge units 110 engages respective engagement point 42 and the respective first engagement point 44 when the chair bracket 96 is in the home position. In this way the child seat 98 is retained in a forward facing orientation on the vehicle seat 22. A respective one of the hinge units 110 is disengaged from the respective engagement point 42 and the respective first engagement point 44 to facilitate the chair bracket 96 to be pivoted toward a respective door on the vehicle. In this way the child can be more easily positioned into the child seat 98 as compared to a child seat that is mounted to the vehicle seat 22 in the conventional manner. The chair bracket 96 is pivoted into the home position when the child is seated in the child seat 98.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A car seat swivel assembly for pivotally mounting a child car seat in a vehicle, said assembly comprising:
   a base bracket having a first portion being oriented at an angle with a second portion such that said base bracket has an L-shape wherein said base bracket is configured to conform to a backrest and a seat of a vehicle seat having said first portion abutting the back rest and having said second portion lying on the seat;
   a pivot bracket being attachable to said base bracket, said pivot bracket having a primary portion being oriented at an angle with a secondary portion such that said pivot bracket has an L-shape, said primary portion having a pair of engagement points being integrated into said primary portion, said secondary portion having a pair of first engagement points being integrated into said secondary portion, each of said first engagement points being aligned with a respective one of said engagement points in said primary portion, said secondary portion having a pair of second engagement points being integrated into said secondary portion, each of said second engagement points being spaced from a respective one of said first engagement points;

a chair bracket being configured to be attached to a child car seat;

a pair of hinge units, each of said hinge units being attached to said chair bracket, each of said hinge units being actuatable between a locking condition and an unlocking condition, each of said hinge units releasably engaging a respective one of said engagement points in said primary portion of said pivot bracket and a respective one of said first engagement points in said secondary portion of said pivot bracket when said chair bracket is in a home position wherein said hinge units are configured to retain the child car seat in a seated position, said chair bracket being pivotable into a pivoted position on said pivot bracket when a respective one of said hinge units is actuated into said unlocking condition wherein said hinge units are configured to facilitate the child car seat to be directed toward a door of a vehicle thereby facilitating a child to be positioned in the child car seat; and wherein said first portion of said base bracket has a front side and a back side, said second portion having a top side and a bottom side, a thickness between said front side and said back side being greater than the thickness between said top side and said bottom side, said first portion having a plurality of first holes each extending through said front side and said back side, said first holes being positioned adjacent to a respective one of four corners of said back side, said second portion having a plurality of second holes each extending through said top side and said bottom side, each of said second holes being positioned adjacent to a respective one of four corners of said second portion.

2. The assembly according to claim 1, wherein said primary portion of said pivot bracket has a front face, a rear face, a top edge, a first lateral edge and a second lateral edge, said secondary portion having an upper face, a lower face, a forward edge, a first sidelong edge and a second sidelong edge, said primary portion having a plurality of primary holes each extending through said front face and said rear face, each of said primary holes being aligned with a respective one of said first holes in said first portion of said base bracket, said secondary portion has a plurality of secondary holes each extending through said upper face and said lower face of said secondary portion, each of said secondary holes being aligned with a respective one of said second holes in said second portion of said base bracket, said secondary portion having a cable hole extending through said upper face and said lower face, said cable hole being centrally positioned on said secondary portion.

3. The assembly according to claim 2, wherein said primary portion has a member extending forwardly from said front face, said member being aligned with said top edge, said member extending beyond each of said first lateral edge and said second lateral edge, said member having a pair of first pin holes each extending through said member such that each of said first pin holes defines a respective one of said engagement points in said primary portion, each of said first pin holes being spaced outwardly beyond a respective one of said first lateral edge and said second lateral edge of said primary portion.

4. The assembly according to claim 3, wherein:

said secondary portion has a pair of first lobes each extending away from a respective one of said first sidelong edge and said second sidelong edge, each of said first lobes being positioned adjacent to said primary portion, each of said first lobes having a second pin hole extending therethrough to define a respective one of said first engagement points, said second pin hole in each of said first lobes being aligned with a respective one of said first pin holes in said member; and said secondary portion has a pair of second lobes each angling away from an intersection between said forward edge and a respective one of said first sidelong edge and said second sidelong edge, said second lobes angling away from each other, each of said second lobes having a third pin hole extending therethrough to define a respective one of said second engagement points.

5. The assembly according to claim 2, wherein said secondary portion has a pair of openings each extending through said upper face and said lower face, each of said openings having a bounding edge, said bounding edge of each of said openings having a first side, a second side and a third side, said first side being oriented perpendicular to said second side, said third side curving between said first side and said second side such that each of said openings has a wedge shape, each of said openings being positioned adjacent to said primary portion having said first side extending along a line being oriented parallel to said front face of said primary portion, said third side of each of said openings curving away from each other.

6. A car seat swivel assembly for pivotally mounting a child car seat in a vehicle, said assembly comprising:

a base bracket having a first portion being oriented at an angle with a second portion such that said base bracket has an L-shape wherein said base bracket is configured to conform to a backrest and a seat of a vehicle seat having said first portion abutting the back rest and having said second portion lying on the seat;

a pivot bracket being attachable to said base bracket, said pivot bracket having a primary portion being oriented at an angle with a secondary portion such that said pivot bracket has an L-shape, said primary portion having a pair of engagement points being integrated into said primary portion, said secondary portion having a pair of first engagement points being integrated into said secondary portion, each of said first engagement points being aligned with a respective one of said engagement points in said primary portion, said secondary portion having a pair of second engagement points being integrated into said secondary portion, each of said second engagement points being spaced from a respective one of said first engagement points;

a chair bracket being configured to be attached to a child car seat;

a pair of hinge units, each of said hinge units being attached to said chair bracket, each of said hinge units being actuatable between a locking condition and an unlocking condition, each of said hinge units releasably engaging a respective one of said engagement points in said primary portion of said pivot bracket and a respective one of said first engagement points in said secondary portion of said pivot bracket when said chair bracket is in a home position wherein said hinge units are configured to retain the child car seat in a seated position, said chair bracket being pivotable into a pivoted position on said pivot bracket when a respective one of said hinge units is actuated into said unlocking condition wherein said hinge units are configured to facilitate the child car seat to be directed toward a door of a vehicle thereby facilitating a child to be positioned in the child car seat; and wherein said chair bracket has a central portion extending between a pair of outward portions, each of said outward portions being oriented perpendicular to said central portion such that said chair bracket has a U-shape, said chair bracket having a lower portion extending between each of said outward portions, said central portion having a plurality of mounting holes each extending through said central portion wherein each of said mounting holes is configured to accommodate fasteners to attach the child car seat to said central portion, said central portion having a cable hole extending through said central portion, said cable hole in said central portion being centrally positioned between said outward portions, said cable hole in said central portion being positioned adjacent to said lower portion.

7. A car seat swivel assembly for pivotally mounting a child car seat in a vehicle, said assembly comprising:

a base bracket having a first portion being oriented at an angle with a second portion such that said base bracket has an L-shape wherein said base bracket is configured to conform to a backrest and a seat of a vehicle seat having said first portion abutting the back rest and having said second portion lying on the seat;

a pivot bracket being attachable to said base bracket, said pivot bracket having a primary portion being oriented at an angle with a secondary portion such that said pivot bracket has an L-shape, said primary portion having a pair of engagement points being integrated into said primary portion, said secondary portion having a pair of first engagement points being integrated into said secondary portion, each of said first engagement points being aligned with a respective one of said engagement points in said primary portion, said secondary portion having a pair of second engagement points being integrated into said secondary portion, each of said second engagement points being spaced from a respective one of said first engagement points;

a chair bracket being configured to be attached to a child car seat;

a pair of hinge units, each of said hinge units being attached to said chair bracket, each of said hinge units being actuatable between a locking condition and an unlocking condition, each of said hinge units releasable engaging a respective one of said enmement points in said primary portion of said pivot bracket and a respective one of said first engagement points in said secondary portion of said pivot bracket when said chair bracket is in a home position wherein said hinge units are configured to retain the child car seat in a seated position, said chair bracket being pivotable into a pivoted position on said pivot bracket when a respective one of said hinge units is actuated into said unlocking condition wherein said hinge units are configured to facilitate the child car seat to be directed toward a door of a vehicle thereby facilitating a child to be positioned in the child car seat; and wherein each of said hinge units comprises:

a block having a top end, a bottom end and an outer wall extending between said top end and said bottom end, said block being hollow, said top end having a first aperture extending into an interior of said block, said bottom end having a second aperture extending into an interior of said block;

a first pin having a lower end and an upper end, said first pin being curved between said lower end and said upper end, said first pin being positioned inside said block; and a first rail gear being movably disposed within said block, said first rail gear having a first surface and a coupled end, said coupled end being coupled to said lower end of said first pin such that said first rail gear extends substantially between said top end and said bottom end of said block, said first surface having a plurality of depressions each being integrated into said first surface to define a plurality of teeth on said first rail gear, said first rail gear being positioned against a first side of said outer wall of said block having each of said teeth being directed toward a center of said block.

8. The assembly according to claim 7, wherein each of said hinge units includes:

a second pin having a lower end and an upper end, said second pin being curved between said lower end and said upper end of said second pin, said second pin being positioned inside said block; and a second rail gear being movably disposed in said block, said second rail gear having a first surface and a coupled end, said coupled end of said second rail gear being coupled to said lower end of said second pin having said second rail gear extending substantially between said top end and said bottom end of said block, said first surface of said second rail gear having a plurality of depressions each being integrated into said first surface of said second rail gear to define a plurality of teeth on said second rail gear, said second block being positioned against a second side of said outer wall of said block having each of said teeth on said second rail gear being directed toward a center of said block.

9. The assembly according to claim 8, wherein each of said hinge units includes:

a knob being rotatably disposed on said outer wall of said block wherein said knob is configured to be rotated by a user; and a rotation gear being disposed within said block, said rotation gear being in communication with said knob such that said knob rotates said rotation gear in a first direction when said knob is rotated, said rotation gear having a plurality of teeth on an outer surface of said rotation gear, each of said teeth on said rotation gear engaging said teeth on said second rail gear and said teeth on said first rail gear, said rotation gear being biased to rotate in a second direction, each of said first pin and said second pin being urged outwardly through a respective one of said first aperture and said second aperture in said top end and said bottom end of said block when said rotation gear rotates in said second direction, each of said first pin and said second pin being retracted into said block when said gear rotates in said first direction.

10. The assembly according to claim 9, wherein:

said primary portion of said pivot bracket includes a member having a pair of first pin holes each extending through said member;

said secondary portion of said pivot bracket has a pair of first lobes each extending away from said secondary portion, each of said first lobes having a second pin hole extending therethrough;

said secondary portion of said pivot bracket has a pair of second lobes each angling away from said secondary portion, each of said second lobes having a third pin hole extending therethrough; and said first pin engages a respective one of said first pin holes in said member associated with said primary portion of said pivot bracket when said chair bracket is in said home position, said second pin engaging said second pin hole in a respective one of said first lobes on said secondary portion of said pivot bracket when said chair bracket is in said home position, each of said first pin and said second pin disengaging said respective first pin hole and said respective second pin hole when said gear rotates in said first direction, said second pin engaging said third pin hole in a respective one of said second lobes on said secondary portion of said pivot bracket when said chair bracket is in said pivoted position.

11. A car seat swivel assembly for pivotally mounting a child car seat in a vehicle, said assembly comprising:

a base bracket having a first portion being oriented at an angle with a second portion such that said base bracket has an L-shape wherein said base bracket is configured to conform to a backrest and a seat of a vehicle seat having said first portion abutting the back rest and having said second portion lying on the seat;

a pivot bracket being attachable to said base bracket, said pivot bracket having a primary portion being oriented at an angle with a secondary portion such that said pivot bracket has an L-shape, said primary portion having a pair of engagement points being integrated into said primary portion, said secondary portion having a pair of first engagement points being integrated into said secondary portion, each of said first engagement points being aligned with a respective one of said engagement points in said primary portion, said secondary portion having a pair of second engagement points being integrated into said secondary portion, each of said second engagement points being spaced from a respective one of said first engagement points;

a chair bracket being configured to be attached to a child car seat;

a pair of hinge units, each of said hinge units being attached to said chair bracket, each of said hinge units being actuatable between a locking condition and an unlocking condition, each of said hinge units releasably engaging a respective one of said engagement points in said primary portion of said pivot bracket and a respective one of said first engagement points in said secondary portion of said pivot bracket when said chair bracket is in a home position wherein said hinge units are configured to retain the child car seat in a seated position, said chair bracket being pivotahle into a pivoted position on said pivot bracket when a respective one of said hinge units is actuated into said unlocking condition wherein said hinge units are configured to facilitate the child car seat to be directed toward a door of a vehicle thereby facilitating a child to be positioned in the child car seat;

wherein said chair bracket has a central portion extending between a pair of outward portions, each of said outward portions being oriented perpendicular to said central portion such that said chair bracket has a U-shape, said chair bracket having a lower portion extending between each of said outward portions;

wherein said secondary portion of said pivot bracket has an upper face; and wherein said assembly includes a roller being rotatably disposed on said lower portion of said chair bracket, said roller rollably engaging said upper face of said secondary portion of said pivot bracket when said chair bracket is moved between said home position and said pivoted position.

12. A car seat swivel assembly for pivotally mounting a child car seat in a vehicle, said assembly comprising:

a base bracket having a first portion being oriented at an angle with a second portion such that said base bracket has an L-shape wherein said base bracket is configured to conform to a backrest and a seat of a vehicle seat having said first portion abutting the back rest and having said second portion lying on the seat;

a pivot bracket being attachable to said base bracket, said pivot bracket having a primary portion being oriented at an angle with a secondary portion such that said pivot bracket has an L-shape, said primary portion having a pair of engagement points being integrated into said primary portion, said secondary portion having a pair of first engagement points being integrated into said secondary portion, each of said first engagement points being aligned with a respective one of said engagement points in said primary portion, said secondary portion having a pair of second engagement points being integrated into said secondary portion, each of said second engagement points being spaced from a respective one of said first engagement points;

a chair bracket being configured to be attached to a child car seat;

a pair of hinge units, each of said hinge units being attached to said chair bracket, each of said hinge units being actuatable between a locking condition and an unlocking condition, each of said hinge units releasably engaging a respective one of said engagement points in said primary portion of said pivot bracket and a respective one of said first engagement points in said secondary portion of said pivot bracket when said chair bracket is in a home position wherein said hinge units are configured to retain the child car seat in a seated position, said chair bracket being pivotable into a pivoted position on said pivot bracket when a respective one of said hinge units is actuated into said unlocking condition wherein said hinge units are configured to facilitate the child car seat to be directed toward a door of a vehicle thereby facilitating a child to be positioned in the child car seat;

wherein said secondary portion of said pivot bracket has a cable hole extending through said secondary portion;

wherein said chair bracket has a central portion, said central portion having a cable hole extending through said central portion; and wherein said assembly includes a cable being attached between said cable hole in said secondary portion of said pivot bracket and said cable hole in said central portion of said chair bracket.

13. A car seat swivel assembly for pivotally mounting a child car seat in a vehicle, said assembly comprising:

a base bracket having a first portion being oriented at an angle with a second portion such that said base bracket has an L-shape wherein said base bracket is configured to conform to a backrest and a seat of a vehicle seat having said first portion abutting the back rest and having said second portion lying on the seat, said first portion having a front side and a back side, said second portion having a top side and a bottom side, a thickness between said front side and said back side being greater than the thickness between said top side and said bottom side, said first portion having a plurality of first holes each extending through said front side and said back side, said first holes being positioned adjacent to a respective one of four corners of said back side, said second portion having a plurality of second holes each extending through said top side and said bottom side, each of said second holes being positioned adjacent to a respective one of four corners of said second portion;

a pivot bracket being attachable to said base bracket, said pivot bracket having a primary portion being oriented at an angle with a secondary portion such that said pivot bracket has an L-shape, said primary portion having a pair of engagement points being integrated into said primary portion, said secondary portion having a pair of first engagement points being integrated into said secondary portion, each of said first engagement points being aligned with a respective one of said engagement points in said primary portion, said secondary portion having a pair of second engagement points being integrated into said secondary portion, each of said second engagement points being spaced from a respective one of said first engagement points, said primary portion having a front face, a rear face, a top edge, a first lateral edge and a second lateral edge, said secondary portion having an upper face, a lower face, a forward edge, a first sidelong edge and a second sidelong edge, said primary portion having a plurality of primary holes each extending through said front face and said rear face, each of said primary holes being aligned with a respective one of said first holes in said first portion of said base bracket, said primary portion having a member extending forwardly from said front face, said member being aligned with said top edge, said member extending beyond each of said first lateral edge and said second lateral edge, said member having a pair of first pin holes each extending through said member such that each of said first pin holes defines a respective one of said engagement points in said primary portion, each of said first pin holes being spaced outwardly beyond a respective one of said first lateral edge and said second lateral edge of said primary portion, said secondary portion having a plurality of secondary holes each extending through said upper face and said lower face of said secondary portion, each of said secondary holes being aligned with a respective one of said second holes in said second portion of said base bracket, said secondary portion having a cable hole extending through said upper face and said lower face, said cable hole being centrally positioned on said secondary portion, said secondary portion having a pair of first lobes each extending away from a respective one of said first sidelong edge and said second sidelong edge, each of said first lobes being positioned adjacent to said primary portion, each of said first lobes having a second pin hole extending therethrough to define a respective one of said first engagement points, said second pin hole in each of said first lobes being aligned with a respective one of said first pin holes in said member, said secondary portion having a pair of second lobes each angling away from an intersection between said forward edge and a respective one of said first sidelong edge and said second sidelong edge, said second lobes angling away from each other, each of said second lobes having a third pin hole extending therethrough to define a respective one of said second engagement points, said secondary portion having a pair of openings each extending through said upper face and said lower face, each of said openings having a bounding edge, said bounding edge of each of said openings having a first side, a second side and a third side, said first side being oriented perpendicular to said second side, said third side curving between said first side and said second side such that each of said openings has a wedge shape, each of said openings being positioned adjacent to said primary portion having said first side extending along a line being oriented parallel to said front face of said primary portion, said third side of each of said openings curving away from each other;

a chair bracket being configured to be attached to a child car seat, said chair bracket having a central portion extending between a pair of outward portions, each of said outward portions being oriented perpendicular to said central portion such that said chair bracket has a U-shape, said chair bracket having a lower portion extending between each of said outward portions, said central portion having a plurality of mounting holes each extending through said central portion wherein each of said mounting holes is configured to accommodate fasteners to attach the child car seat to said central portion, said central portion having a cable hole extending through said central portion, said cable hole in said central portion being centrally positioned between said outward portions, said cable hole in said central portion being positioned adjacent to said lower portion;

a pair of hinge units, each of said hinge units being attached to said chair bracket, each of said hinge units being actuatable between a locking condition and an unlocking condition, each of said hinge units releasably engaging a respective one of said engagement points in said primary portion of said pivot bracket and a respective one of said first engagement points in said secondary portion of said pivot bracket when said chair bracket is in a home position wherein said hinge units are configured to retain the child car seat in a seated position, said chair bracket being pivotable into a pivoted position on said pivot bracket when a respective one of said hinge units is actuated into said unlocking condition wherein said hinge units are configured to facilitate the child car seat to be directed toward a door of a vehicle thereby facilitating a child to be positioned in the child car seat, each of said hinge units comprising:

a block having a top end, a bottom end and an outer wall extending between said top end and said bottom end, said block being hollow, said top end having a first aperture extending into an interior of said block, said bottom end having a second aperture extending into an interior of said block;

a first pin having a lower end and an upper end, said first pin being curved between said lower end and said upper end, said first pin being positioned inside said block;

a first rail gear being movably disposed within said block, said first rail gear having a first surface and a coupled end, said coupled end being coupled to said lower end of said first pin such that said first rail gear extends substantially between said top end and said bottom end of said block, said first surface having a plurality of depressions each being integrated into said first surface to define a plurality of teeth on said first rail gear, said first rail gear being positioned against a first side of said outer wall of said block having each of said teeth being directed toward a center of said block;

a second pin having a lower end and an upper end, said second pin being curved between said lower end and said upper end of said second pin, said second pin being positioned inside said block;

a second rail gear being movably disposed in said block, said second rail gear having a first surface and a coupled end, said coupled end of said second rail gear being coupled to said lower end of said second pin having said second rail gear extending substantially between said top end and said bottom end of said block, said first surface of said second rail gear having a plurality of depressions each being integrated into said first surface of said second rail gear to define a plurality of teeth on said second rail gear, said second block being positioned against a second side of said outer wall of said block having each of said teeth on said second rail gear being directed toward a center of said block;

a knob being rotatably disposed on said outer wall of said block wherein said knob is configured to be rotated by a user; and a rotation gear being disposed within said block, said rotation gear being in communication with said knob such that said knob rotates said rotation gear in a first direction when said knob is rotated, said rotation gear having a plurality of teeth on an outer surface of said rotation gear, each of said teeth on said rotation gear engaging said teeth on said second rail gear and said teeth on said first rail gear, said rotation gear being biased to rotate in a second direction, each of said first pin and said second pin being urged outwardly through a respective one of said first aperture and said second aperture in said top end and said bottom end of said block when said rotation gear rotates in said second direction, each of said first pin and said second pin being retracted into said block when said gear rotates in said first direction, said first pin engaging a respective one of said first pin holes in said member associated with said primary portion of said pivot bracket when said chair bracket is in said home position, said second pin engaging said second pin hole in a respective one of said first lobes on said secondary portion of said pivot bracket when said chair bracket is in said home position, each of said first pin and said second pin disengaging said respective first pin hole and said respective second pin hole when said gear rotates in said first direction, said second pin engaging said third pin hole in a respective one of said second lobes on said secondary portion of said pivot bracket when said chair bracket is in said pivoted position;

a roller being rotatably disposed on said lower portion of said chair bracket, said roller rollably engaging said upper face of said secondary portion of said pivot bracket when said chair bracket is moved between said home position and said pivoted position; and a cable being attached between said cable hole in said secondary portion of said pivot bracket and said cable hole in said central portion of said chair bracket.

\* \* \* \* \*